United States Patent
She et al.

(10) Patent No.: US 9,809,119 B2
(45) Date of Patent: Nov. 7, 2017

(54) BI-DIRECTIONAL DC-DC POWER CONVERTER FOR A VEHICLE SYSTEM

(71) Applicant: General Electric Company, Schenectady, NY (US)

(72) Inventors: Xu She, Niskayuna, NY (US); Robert Dean King, Schenectady, NY (US); Kum-Kang Huh, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 361 days.

(21) Appl. No.: 14/595,706

(22) Filed: Jan. 13, 2015

(65) Prior Publication Data
US 2016/0200202 A1    Jul. 14, 2016

(51) Int. Cl.
*B60L 11/18*  (2006.01)
*H02M 3/335*  (2006.01)
*H02M 1/00*  (2006.01)

(52) U.S. Cl.
CPC .......... *B60L 11/18* (2013.01); *B60L 11/1803* (2013.01); *H02M 3/33584* (2013.01);
(Continued)

(58) Field of Classification Search
CPC .. B60L 11/18; B60L 11/1803; Y02T 10/7208; Y02T 10/72176; H02M 2001/0093
See application file for complete search history.

(56) References Cited

U.S. PATENT DOCUMENTS 5,373,195 A    12/1994  De Doncker et al.
6,369,461 B1 *  4/2002  Jungreis ............... H01M 16/003
                                                              307/23
(Continued)

FOREIGN PATENT DOCUMENTS

CN    103312020 A    9/2013

OTHER PUBLICATIONS

Han et al., "Bi-Directional DC/DC Converters for Plug-in Hybrid Electric Vehicle (PHEV) Applications", Applied Power Electronics Conference and Exposition, 2008, APEC 2008, Twenty-Third Annual IEEE, pp. 784-789, ISSN : 1048-2334, Feb. 24-28, 2008, Austin, TX.

(Continued)

*Primary Examiner* — Thomas J Hiltunen
(74) *Attorney, Agent, or Firm* — Meagher Emanuel Laks Goldberg & Liao, LLP (57) ABSTRACT

A bi-directional DC-DC converter assembly that processes and transfers differential power in a variable manner is disclosed. The converter assembly is coupled to an energy storage device and DC link, with the converter assembly including a first converter section coupled to the energy storage device and a second converter section coupled to the DC link and to the energy storage device. The converter assembly processes a first portion of the DC power output of the energy storage device and provides an unprocessed second portion of the DC power output of the energy storage device to the second converter section when providing power to the load, and processes a first portion of a regenerative power from the load and provides an unprocessed second portion of the regenerative power from the load to the first converter section when providing regenerative power to the energy storage device.

22 Claims, 6 Drawing Sheets

(52) U.S. Cl.
CPC .......... *B60L 2210/10* (2013.01); *H02M 3/335* (2013.01); *H02M 2001/0093* (2013.01); *Y02T 10/7005* (2013.01); *Y02T 10/7216* (2013.01)

(56) References Cited

U.S. PATENT DOCUMENTS

| | | | |
|---|---|---|---|
| 6,370,050 B1* | 4/2002 | Peng ................ | H02M 3/33576 363/17 |
| 7,733,039 B2 | 6/2010 | Su | |
| 7,889,524 B2 | 2/2011 | Lee et al. | |
| 8,030,900 B2* | 10/2011 | Hussain ................ | H02J 7/0057 320/135 |
| 8,134,343 B2 | 3/2012 | Like et al. | |
| 8,154,149 B2 | 4/2012 | King | |
| 8,330,299 B2 | 12/2012 | Steigerwald et al. | |
| 8,860,359 B2 | 10/2014 | Cao et al. | |
| 8,963,482 B2* | 2/2015 | Ang ........................ | H02J 7/022 320/103 |
| 9,520,806 B2* | 12/2016 | Yamada ................ | H01M 10/44 |
| 9,559,620 B2* | 1/2017 | Zushi ................ | H02M 3/33576 |
| 2013/0113287 A1 | 5/2013 | Singh et al. | |
| 2014/0244082 A1 | 8/2014 | Caron | |
| 2015/0002057 A1 | 1/2015 | Zushi et al. | |
| 2015/0097507 A1* | 4/2015 | Kim ...................... | H02M 7/797 318/504 |
| 2015/0203060 A1* | 7/2015 | Kamioka .............. | B60R 16/033 307/10.1 |
| 2015/0372622 A1* | 12/2015 | Ortiz ........................ | H02P 3/14 318/376 |
| 2016/0144725 A1* | 5/2016 | Nozawa .................. | B60L 11/18 307/10.1 |
| 2016/0276941 A1* | 9/2016 | Iwaya ............... | H02M 3/33584 |
| 2016/0318418 A1* | 11/2016 | Tokushige .............. | H02J 7/007 |

OTHER PUBLICATIONS

Min et al., "A New Topology With High Efficiency Throughout All Load Range for Photovoltaic PCS," IEEE Transactions on Industrial Electronics, vol. 56, No. 11, Nov. 2009, pp. 4427-4435.

European Search Report and Opinion issued in connection with corresponding EP Application No. 16150804.9 dated May 19, 2016.

* cited by examiner

BI-DIRECTIONAL DC-DC POWER CONVERTER FOR A VEHICLE SYSTEM

BACKGROUND OF THE INVENTION

Embodiments of the invention relate generally to power converters and, more particularly, to a bi-directional DC-DC power converter that processes and transfers differential power in a variable manner. The bi-directional DC-DC power converter processes power received thereby in a variable fashion, in both power flow directions, with a portion of the power received thereby being delivered directly to the other side of the converter without being processed.

Electric vehicles and hybrid electric vehicles are typically powered by one or more energy storage devices, either alone or in combination with an internal combustion engine. In pure electric vehicles, the one or more energy storage devices power the entire drive system, thereby eliminating the need for an internal combustion engine. Hybrid electric vehicles, on the other hand, include energy storage device power to supplement power supplied by an internal combustion engine, which greatly increases the fuel efficiency of the internal combustion engine and of the vehicle. Traditionally, the energy storage devices in electric or hybrid electric drive systems include batteries, ultracapacitors, flywheels, or a combination of these elements in order to provide sufficient energy to power an electric motor.

In electric and hybrid electric vehicles, energy may be transferred from one or more of these energy storage devices to a DC link coupled to a DC load (e.g., the electric motor). Typically, one or more DC-DC voltage converters (e.g., bi-directional buck/boost converters) are often employed to decouple the energy storage device voltage(s) from a DC link voltage (with the DC link being coupled to the electric motor), with one or multiple converters being employed to provide this decoupling. The bi-directional DC-DC voltage converters act to increase, or "boost", the voltage(s) provided from the energy storage device(s) to the DC link to meet the power demands of the electric motor and act to decrease, or "buck", the voltages generated from the electric motor during regenerative braking before providing the regenerative power to the energy storage device(s) to recharge the device(s).

While existing arrangements of bi-directional DC-DC voltage converters successfully allow for an increased supply of voltage to the DC link or a step-down of voltage to recharge energy storage device(s), certain drawbacks are associated with the use of such voltage converters. That is, in electric and hybrid electric vehicles, the typical DC-DC voltage converter that is provided is a full power rating DC-DC converter that includes switches which are employed in the power conversion process to carry the full power. In carrying the full power, the switches conduct higher current so as to generate more losses and also put higher requirements on the thermal management of the converter. Accordingly, the volume and weight of the system is further increased, and the cost of the system will also increase.

Previous attempts to address the issue of DC-DC converter inefficiency have focused mainly on utilizing improved DC-DC converter topology, design methodology, and component materials. However, each of these solutions can improve the performance of the vehicle system only by a limited amount and achieve these efficiency improvements only at an additional cost.

Therefore, it is desirable to provide a bi-directional DC-DC voltage converter having a reduced volume, weight, and losses and an increased efficiency, with the converter realizing an increased efficiency without associated cost increases.

BRIEF DESCRIPTION OF THE INVENTION

Embodiments of the invention are directed to a bi-directional DC-DC power converter that transfers differential power to a load.

In accordance with one aspect of the invention, a vehicle system includes a DC link, a load coupled to the DC link and configured to receive energy from the DC link, an energy storage device configured to generate a DC power output, and a bi-directional DC-DC converter assembly coupled to each of the energy storage device and the DC link and positioned therebetween, the bi-directional DC-DC converter comprising a first converter section coupled to the energy storage device and a second converter section coupled to the DC link, wherein the second converter section is also coupled with the energy storage device. The bi-directional DC-DC converter assembly is configured to process a first portion of the DC power output of the energy storage device and provide an unprocessed second portion of the DC power output of the energy storage device to the second converter section, when providing power to the load from the energy storage device and process a first portion of a regenerative power from the load and provide an unprocessed second portion of the regenerative power from the load to the first converter section, when providing regenerative power from the load to the energy storage device.

In accordance with another aspect of the invention, a vehicle system includes a DC link, a load coupled to the DC link and configured to receive energy from the DC link, an energy storage device configured to generate a DC power output, and a bi-directional DC-to-DC partial power converter configured to selectively operate in a boost mode to boost a voltage of the DC power from the energy storage device to the DC link and a buck mode to buck a voltage of the DC power from the DC link to the energy storage device. In operating the bi-directional DC-to-DC partial power converter in each of the boost mode and the buck mode, a first portion of power received by the bi-directional DC-to-DC partial power converter is processed so as to boost or buck the voltage and a second portion of power received by the bi-directional DC-to-DC partial power converter is unprocessed.

In accordance with yet another aspect of the invention, a method is provided for transferring power in a vehicle system that includes an energy storage device, a direct current (DC) link, a load, and a bi-directional DC-DC converter assembly. The method includes operating the bi-directional DC-DC converter assembly in a boost mode to boost a DC voltage from an output of the energy storage device to the DC link or in a buck mode to buck voltage from the DC link to the energy storage device. In operating the bi-directional DC-DC converter assembly in the boost mode or the buck mode, the method further includes determining a voltage differential between the energy storage device and the DC link, determining a first portion of power received by the bi-directional DC-DC converter assembly to be processed so as to boost or buck the received power, determining a second portion of power received by the bi-directional DC-DC converter assembly to remain unprocessed, causing the bi-directional DC-DC converter assembly to process the first portion of the received power and leave the second portion of the received power unprocessed, and collectively outputting the processed first portion and unprocessed second portion from the bi-directional DC-DC converter assembly.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the invention provide a bi-directional DC-DC power converter that processes and transfers differential power to a load in a variable manner. The bi-directional DC-DC power converter operates as a partial power converter, in that a portion of power received thereby is processed (i.e., boosted/bucked) and a portion of the power received thereby is delivered directly to the other side of the converter without being processed.

Figure 1:
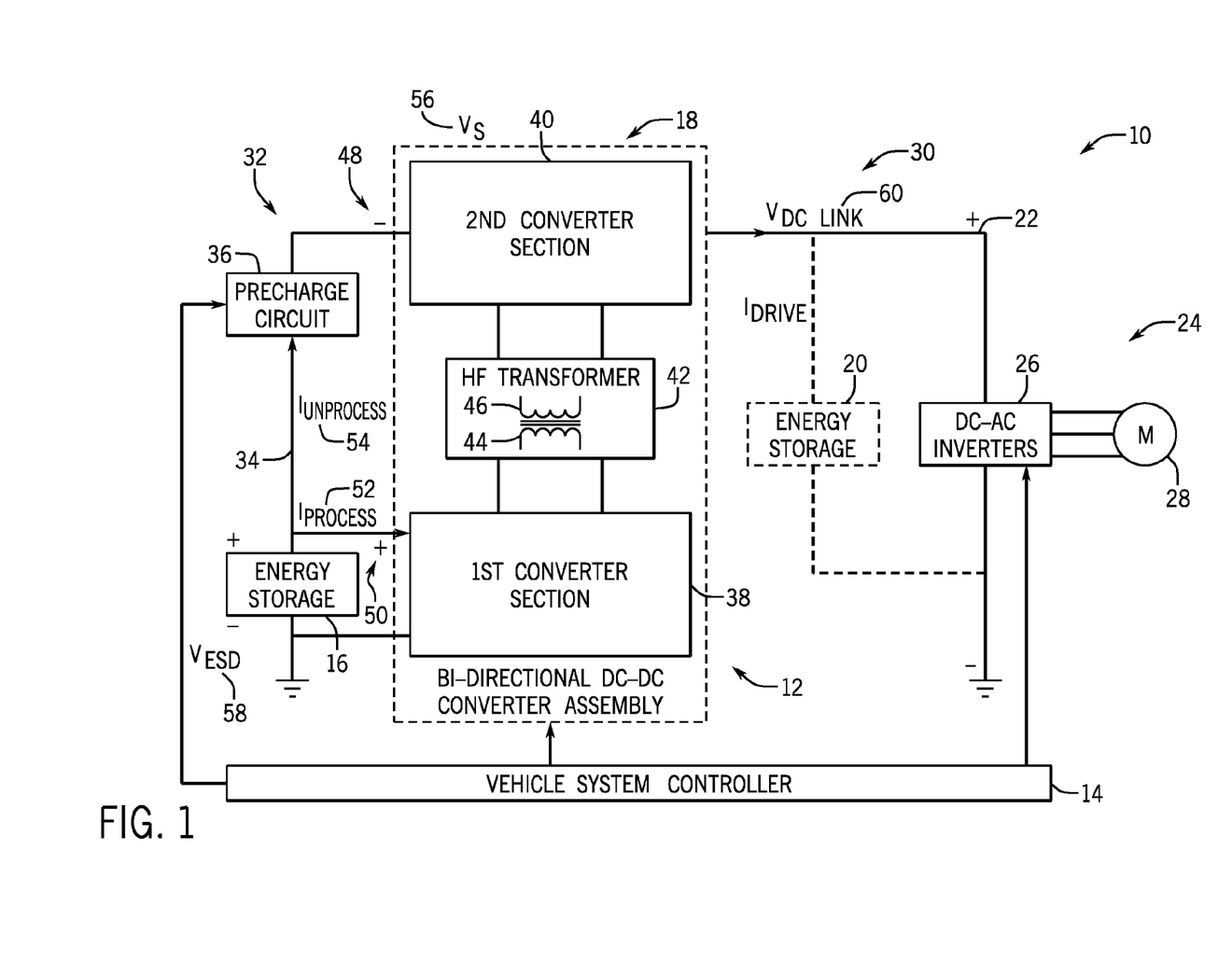
FIG. 1 is a schematic block diagram of a vehicle drive system, according to an embodiment of the invention.

FIG. 1 illustrates a vehicle system 10 according to an embodiment of the invention. Vehicle system 10 may be used in electric or hybrid vehicle applications and, according to one embodiment, is used as part of the vehicle propulsion (i.e., drive) system, although it is recognized that the system could also be used as part of a start-up system for the vehicle. The vehicle system 10 includes an energy system 12 and a vehicle system controller 14. Energy system 12 includes a first energy storage device 16 and a bi-directional DC-DC converter assembly 18, i.e., a bi-directional buck/boost converter assembly. According to the embodiment shown in FIG. 1, energy system 12 may also optionally include a second energy storage device 20. According to one embodiment, the first energy storage device 16 may be a high specific energy battery or high energy density battery demonstrated to achieve an energy density on the order of 100 W-hr/kg or greater (e.g., a Li-ion, sodium-metal halide, sodium nickel chloride, sodium-sulfur, or zinc-air battery), although another type of energy storage devices such as an ultracapacitor, a fuel cell, a flywheel, or the like is also contemplated. The second energy storage device 20 may be a battery having a high specific-power rating or an ultracapacitor, for example.

As shown in FIG. 1, second energy storage device 20 is coupled via a DC link 22 to a load 24 to provide power thereto. First energy storage device 16 also provides power to the load 24, with the first energy storage device 16 providing power through the bi-directional DC-DC converter assembly 18, which is positioned between the first energy storage device 16 and DC link 22. According to an embodiment of the invention, load 24 is an electric drive including a DC-AC inverter 26 and a motor or electromechanical device 28. Motor 28 is preferably an AC motor, but is not limited as such. While not shown, it is to be understood that motor 28 may be coupled to a respective wheel or other load or that motor 28 may be coupled to a differential for distributing rotational power to the wheels or other load.

Generally, in an accelerating mode of operation, voltage provided by second energy storage device 20, on a high voltage side 30 of energy system 12, is supplied to DC-AC inverter 26 via DC link 22 to drive motor 28. Bi-directional DC-DC converter assembly 18 also acts to boost the voltage provided by a low voltage side 32 of energy system 12 to the high voltage side 30 of energy system 12. That is, voltage from first energy storage device 16 is provided to bi-directional DC-DC converter assembly 18 via a bus 34 coupled thereto on the low voltage side 32 of energy system 12. As will be explained in greater detail below, all or a portion of the provided voltage by the first energy storage device 16 is boosted by bi-directional DC-DC converter assembly 18 in a boost mode of operation, such that the voltage provided to DC link 22 on the high voltage side 30 of energy system 12 is increased to an operating level of electric drive 24.

In a deceleration mode of operation in which the speed of rotation of motor 28 is to be decreased to zero or to a lower speed from its current speed, system controller 14 is programmed to operate electric drive 24 in a regenerative mode, wherein electric power or energy is returned to DC link 22 through DC-AC inverter 26 during a regenerative braking event. Bi-directional DC-DC converter assembly 18 acts to buck the power generated from the regenerative braking event to a voltage suitable for recharging the first energy storage device 16. As will be explained in greater detail below, all or a portion of the voltage on the DC bus 22 is bucked by bi-directional DC-DC converter assembly 18 in a buck mode of operation such that the voltage provided to the first energy storage device 16 on the low voltage side 32 of energy system 12 is decreased to a voltage rating of the first energy storage device 16.

In addition to accelerating and decelerating modes of operation, a start-up sequence procedure is also performed to initiate operation of the vehicle, wherein initial pre-charge energy is provided to second energy storage system 20. Under optimal conditions, second energy storage device 20 receives this initial pre-charge from energy provided via first energy storage device 16. That is, when vehicle system controller 14 receives an operator input to initiate vehicle start-up, vehicle system controller 14 sends a command to first energy storage device 16 to provide pre-charge energy to second energy storage device 20. This energy is provided via a dedicated pre-charge circuit 36 coupled to first energy storage system 16 and to bi-directional DC-DC converter assembly 18 via bus 34. As discussed above, bi-directional DC-DC converter assembly 18 is configured to boost the voltage provided to DC link 22 and, ultimately, second energy storage system 20. When second energy storage system 20 is pre-charged, it is capable of providing energy via DC link 22 to DC-AC inverter 26 of electric drive 24 to initiate vehicle start-up, thereby completing the vehicle's start-up sequence procedure.

As shown in FIG. 1, bi-directional DC-DC converter assembly 18 is constructed and connected in energy system 12 so as to function as a bi-directional DC-to-DC partial power converter, since only a portion of the power received by the converter assembly is converted and/or processed before being output thereby. Bi-directional DC-DC converter assembly 18 is generally illustrated in FIG. 1 as including a first converter section 38 and a second converter section 40, with at least one transformer 42 also included in the converter assembly 18 and forming a part of each of the first and second converter sections 38, 40. The transformer 42 includes at least one primary winding 44 that forms part of the first converter section 38 and at least one secondary winding 46 that forms part of the second converter section 40. According to one embodiment, the bi-directional DC-DC converter assembly 18 may thus be constructed as a push-pull-type converter that includes transformer 42, although it is recognized that any other suitable DC to DC converter arrangement may be used that provides for partial power conversion.

During operation of the bi-directional DC-DC converter assembly 18 in a boost mode of operation, the first converter section 38 would function as in "input section" that receives power from first energy storage device 16, with second converter section 40 functioning as an "output section" that provides power to DC link 22. During operation of the bi-directional DC-DC converter assembly 18 in a buck mode of operation, the second converter section 40 would function as in "input section" that receives power from DC link 22, with first converter section 38 functioning as an "output section" that provides power to first energy storage device 16.

In an exemplary embodiment, during operation of the bi-directional DC-DC converter assembly 18 in the boost mode of operation, a DC power output of first energy storage device 16 is coupled to primary winding 44 and to secondary winding 46. Additionally, a negative terminal 48 of the second converter section 40 is connected in series with a positive terminal 50 of the first converter section 38, such that a first portion ($I_{process}$) 52 of a DC current output by first energy storage device 16 is provided to first converter section 38 and a second portion ($I_{unprocess}$) 54 of a DC current output by first energy storage device 16 is provided directly (without processing) to second converter section 40 with almost no loss—i.e., nearly 100% efficiency. First converter section 38 and second converter section 40 are also mutual-inductively coupled. More specifically, primary winding 44 is mutual-inductively coupled to secondary winding 46. In operation, a time-varying current flowing through primary winding 44 induces a voltage across secondary winding 46.

Also during operation of the bi-directional DC-DC converter assembly 18 in the boost mode of operation, first converter section 38 extracts a portion of the DC current generated by first energy storage device 16. Furthermore, second converter section 40 is coupled in series with first energy storage device 16 such that an output voltage 56 (Vs) of bi-directional DC-DC converter assembly 18 is in series with output voltage 58 ($V_{ESD}$) of first energy storage device 16. In other words, a voltage delivered to DC link 22, referred to herein as $V_{DClink}$ 60, is the sum of first energy storage device voltage 58 ($V_{ESD}$) and DC-DC converter voltage 56 (Vs). Moreover, the power delivered to DC link 22 exceeds the power processed and/or converted by bi-directional DC-DC converter assembly 18. Therefore, the power rating for bi-directional DC-DC converter assembly 18 can be lower than if all of the power delivered to DC link 22 was processed and/or converted by bi-directional DC-DC converter assembly 18. Even though the power rating for bi-directional DC-DC converter assembly 18 is lower than the power delivered to DC link 22, bi-directional DC-DC converter assembly 18 maintains the ability to control $I_{drive}$, also referred to as the DC link current.

While operation of the bi-directional DC-DC converter assembly 18 is described above with respect to the boost mode of operation thereof, it is recognized that the converter assembly 18 similarly operates during the buck mode of operation. That is, during operation of the bi-directional DC-DC converter assembly 18 in the buck mode of operation, a DC power on DC link 22 (provided from the load 24 due to a regenerative braking event—i.e., regenerative power) is coupled to secondary winding 46 and to primary winding 44. A first portion of a DC current on DC link 22 is provided to/extracted by second converter section 40 and a second portion of a DC current on DC link is provided directly to first converter section 38 without processing, such that no loss is present on the unprocessed second portion. It is further recognized that the efficiency of the bi-directional DC-DC converter assembly 18 will vary between its operation in boost mode as compared to its operation in buck mode.

Figure 2:
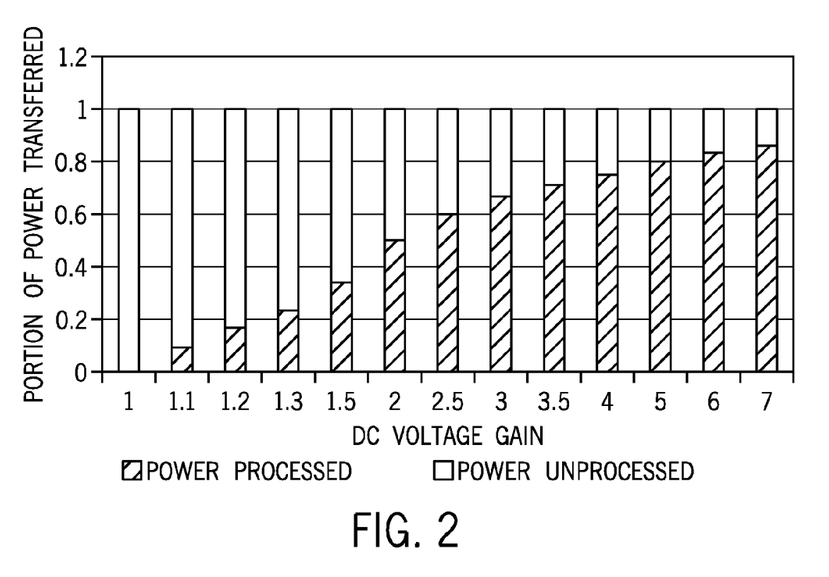
FIG. 2 is a graph illustrating processed and unprocessed portions of DC power provided to the bi-directional DC-DC power converter included in the vehicle drive system of FIG. 1 for varying DC voltage gains.

Depending on the operating conditions of vehicle system 10, the differential power processed by the bi-directional DC-DC converter assembly 18 will vary. Referring now to FIG. 2, the portion of the power being processed by the DC-DC converter 18 for a plurality of different DC voltage gains (i.e., ratio/difference of DC link voltage to first energy storage device voltage) is shown—for operation of the converter in the boost of operation, as an example. It can be seen in FIG. 2 that with a small DC gain, a value of the second portion of power—i.e., the unprocessed portion of power—is increased, such that a majority of the power received by the bi-directional DC-DC converter assembly 18 is delivered directly to the other side (to the DC link 22 in boost mode and to the first energy storage device 16 in buck mode) without being processed. Conversely, with a large DC gain, a value of the first portion of power—i.e., the processed portion of power—is increased, such that a majority of the power received by the bi-directional DC-DC converter assembly 18 is bucked/boosted thereby. Based on a varying of the value/amount of power being process by the bi-directional DC-DC converter assembly 18, the overall efficiency of the converter assembly 18 (and the vehicle system 10 as a whole) is improved.

An example of a DC voltage gain in a mild hybrid electric vehicle system is a 14V/42V dual voltage system where the dc voltage gain is 3. In this condition, the power being processed by the bi-directional DC-DC converter assembly 18 (i.e., a "first portion" that is processed) is less than 70%. With a second energy storage device 20, such as an ultracapacitor, being put at the high voltage side of the DC-DC converter, this voltage may decrease to half of the rated value, letting the DC gain be about 1.5. Therefore, the power processed by the bi-directional DC-DC converter assembly 18 is less than 40% percent. An example of a DC voltage gain in a full hybrid electric vehicle system is a system where the first energy storage device voltage ranges from 200-300V and the high voltage DC link voltage ranges from 200-600V, such that the DC gain varies from 1 to 3. Therefore, the bi-directional DC-DC converter assembly 18 only processes 0 to 40% rated power depending on the operating condition. The rest (i.e., a "second portion") of the power is unprocessed—such that it is provided with nearly 100% efficiency, and therefore the efficiency of the whole system is improved.

Figure 3:
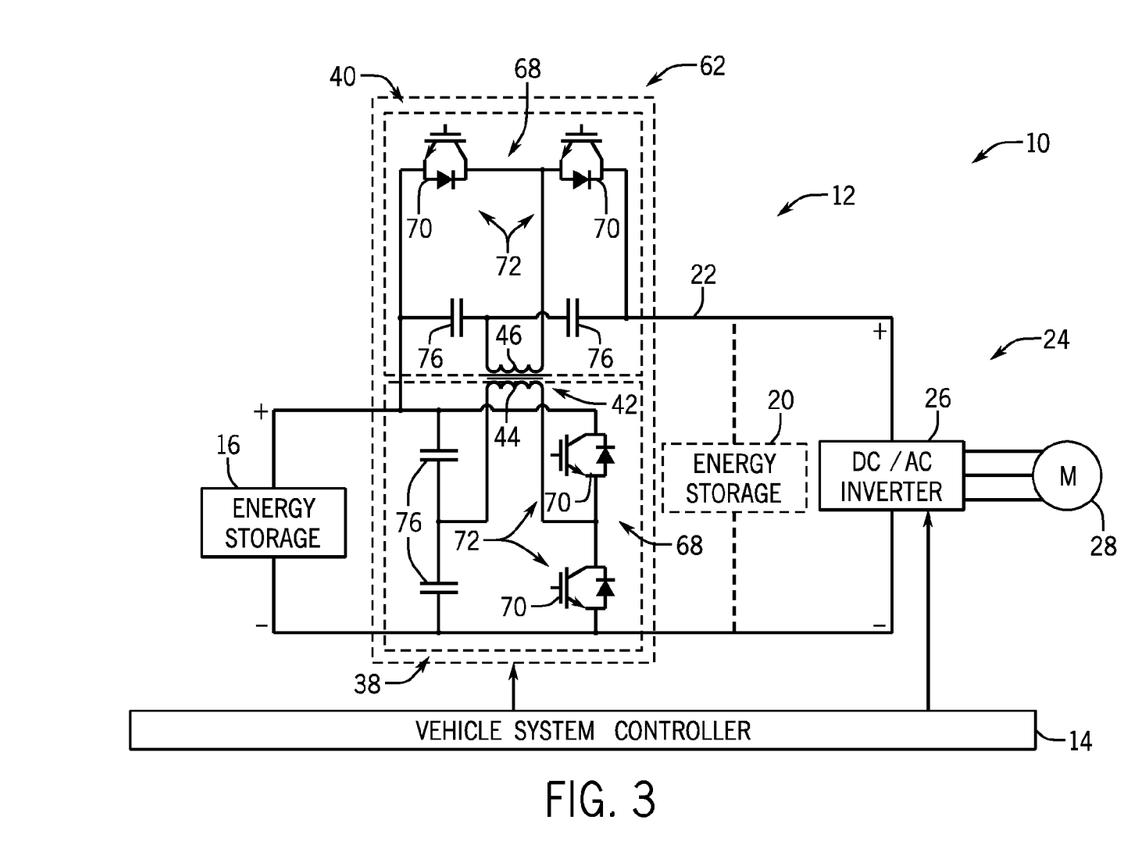
FIG. 3 is a schematic block diagram of a bi-directional DC-DC power converter included in the vehicle drive system of FIG. 1, with attached sources/loads, according to an embodiment of the invention.
Figure 4:
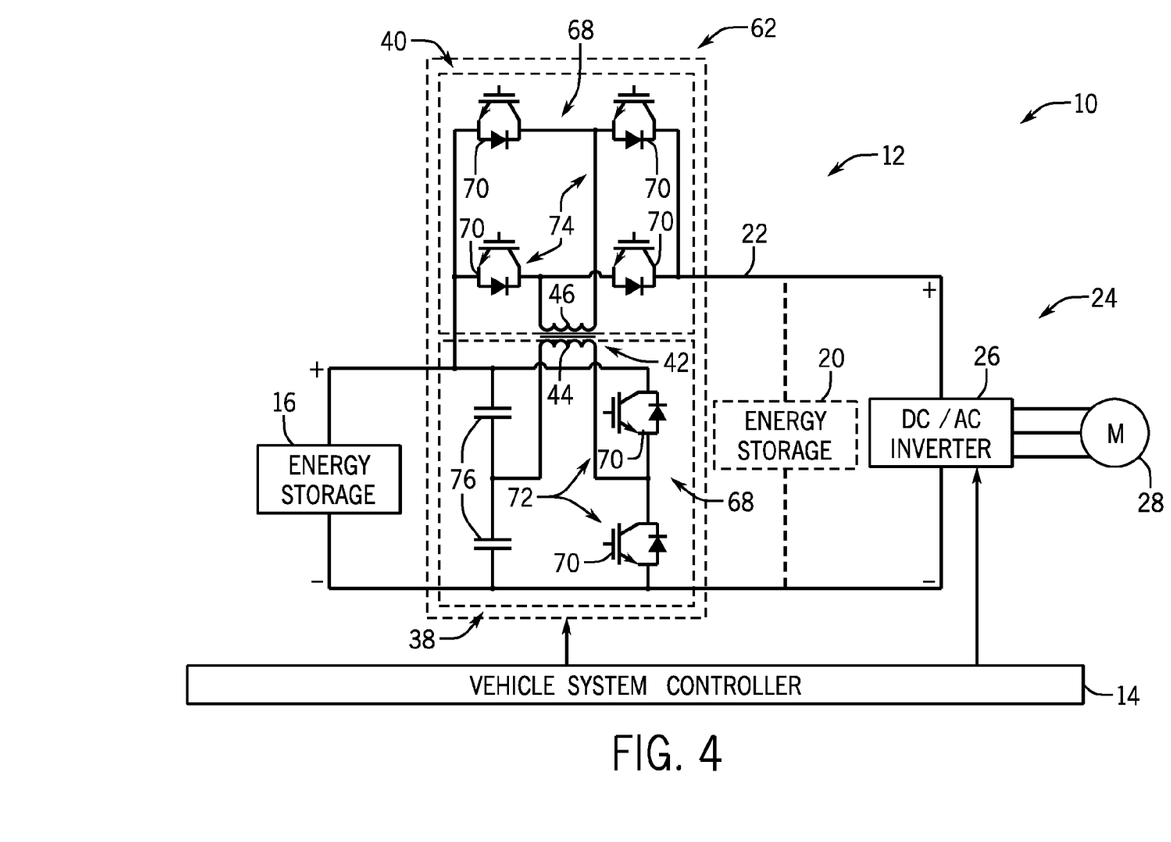
FIG. 4 is a schematic block diagram of a bi-directional DC-DC power converter included in the vehicle drive system of FIG. 1, with attached sources/loads, according to an embodiment of the invention.
Figure 5:
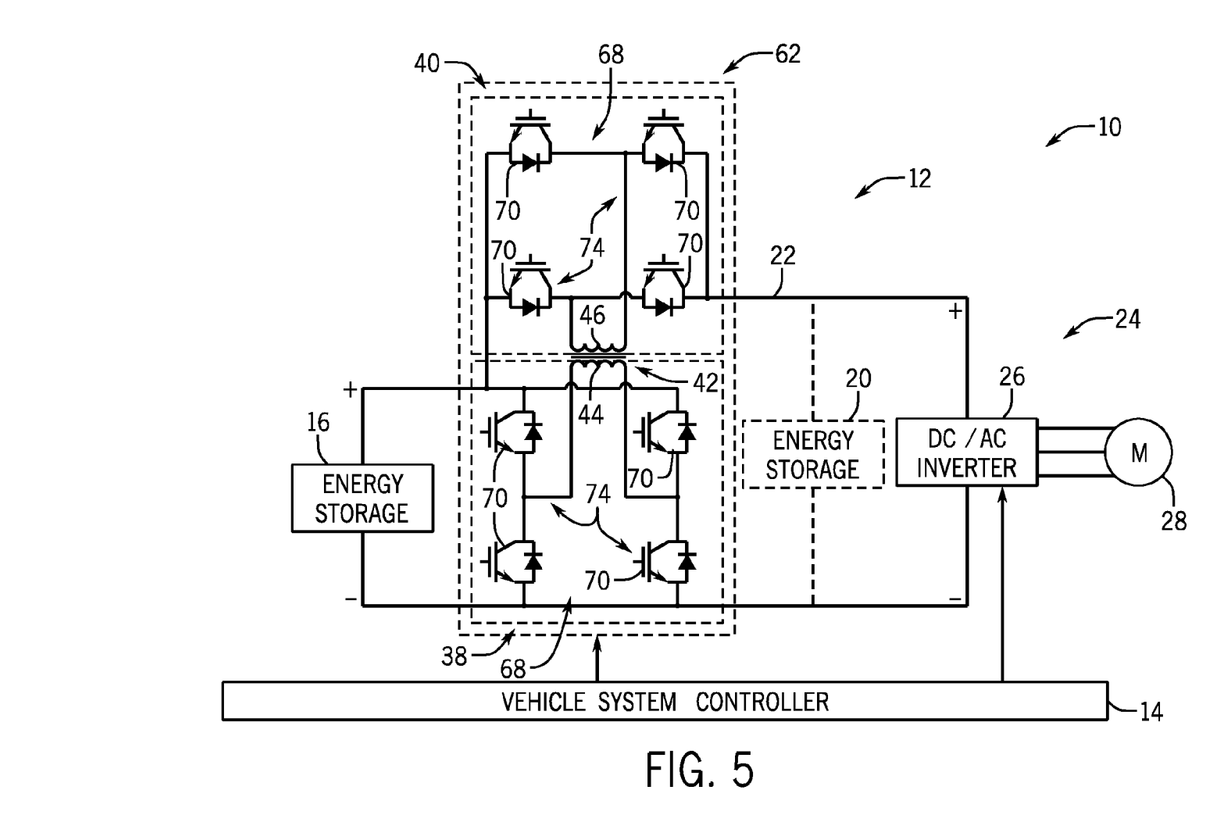
FIG. 5 is a schematic block diagram of a bi-directional DC-DC power converter included in the vehicle drive system of FIG. 1, with attached sources/loads, according to an embodiment of the invention.

Referring now to FIGS. 3-5, the structure of bi-directional DC-DC converter assembly 18 is shown in greater detail according to a number of embodiments of the invention. In the bi-directional DC-DC converter assemblies 62, 64, 66 of FIGS. 3-5, respectively, it is seen that the first converter section 38 and second converter section 40 in each converter assembly includes a switching network 68 therein formed of switching devices 70 that collectively control current through the windings 44, 46 of the power transformer 42. According to an exemplary embodiment, the switching devices 70 are provided as metal oxide semiconductor field effect transistors (MOSFETs) operable in an On state and an Off state to control current flow therethrough. However, embodiments of the invention are not limited to MOSFETs. Any appropriate electronic switch can be used, such as, for example, insulated gate bipolar transistors (IGBTs) in antiparallel with a diode, bipolar junction transistors (BJTs), and metal oxide semiconductor controlled thyristors (MCTs). The switching devices (and diodes) can be made with Silicon (Si), Silicon Carbide (SiC), Gallium Nitride (GaN), or any suitable Wide Bandgap (WBG) material.

According to the embodiment of FIG. 3, the switching network 68 in each of the first converter section 38 and second converter section 40 includes two switching devices 70 (e.g., MOSFETs) that are arranged so as to provide a half-bridge circuit topology 72, with the switching devices 70 being controlled to provide a desired power conversion.

According to the embodiment of FIG. 4, the switching network 68 in the first converter section 38 includes two switching devices 70 that are arranged so as to provide a half-bridge circuit topology 72, while the second converter section 40 includes four switching devices 70 that are arranged so as to provide a full-bridge circuit topology 74, with the switching devices 70 being controlled to provide a desired power conversion.

According to the embodiment of FIG. 5, the switching network 68 in each of the first converter section 38 and second converter section 40 includes four switching devices 70 that are arranged so as to provide a so as to provide a full-bridge circuit topology 74, with the switching devices 70 being controlled to provide a desired power conversion.

As further shown in FIGS. 3 and 4, one or both of first converter section 38 and second converter section 40 also includes a pair of capacitors 76 arranged in parallel with the switching devices 70 (i.e., with the half-bridge circuit 72) that store and release DC power received on its respective converter section. The controlling of the switching devices 70 provides for the storing and releasing of DC power by the capacitors 76, with the DC power being selectively provided to the primary or secondary winding 44, 46 of the transformer 42.

Figure 6:
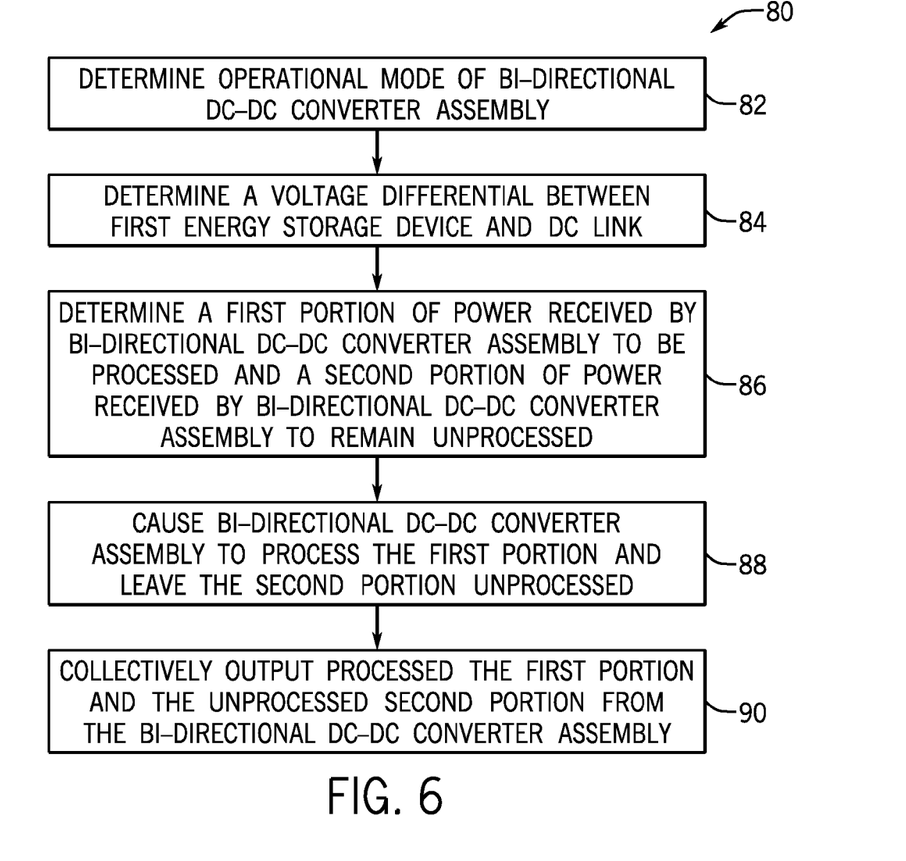
FIG. 6 is a flowchart illustrating a technique for transferring power in a vehicle system, according to an embodiment of the invention.

Referring now to FIG. 6, and with continued reference to FIGS. 1-5, a technique 80 for transferring power in vehicle system 10 is illustrated according to an embodiment of the invention. According to an exemplary embodiment, the technique 80 is performed (in part) via the vehicle system controller 14, although it is recognized that a controller separate from vehicle system controller 14 could instead be employed to perform the technique. The technique 80 begins at STEP 82, with the bi-directional DC-DC converter assembly 18 being operated either in a boost mode to boost a DC output voltage from the first energy storage device 16 to the DC link 22 or in a buck mode to buck voltage from the DC link 22 to the first energy storage device 16. The determination of whether to operate in boost or buck mode is made based on a current operating state of the vehicle—i.e., whether the vehicle is in an acceleration or high speed mode of operation (where the boost mode would be implemented) or in a deceleration mode of operation (where the buck mode would be implemented).

In causing the bi-directional DC-DC converter assembly 18 to operate in the boost mode or the buck mode, the technique 80 determines a voltage differential between the first energy storage device 16 and the DC link 22 at STEP 84, so as to control energy flowing from and flowing into first energy storage device 16. Such a determination can be made based on voltage measurements received by the controller 14 from the first energy storage device 16 and the DC link 22 via voltage sensors included in the vehicle system 10. After determining voltage differential between the first energy storage device 16 and the DC link 22, the technique continues at STEP 86 by determining a first portion of power received by the bi-directional DC-DC converter assembly 18 to be processed (i.e., boosted or bucked) and a second portion of power received by the bi-directional DC-DC converter assembly to remain unprocessed. As indicated previously with respect to FIG. 2, the differential power processed by the bi-directional DC-DC converter assembly 18 will vary depending on the operating conditions of vehicle system 10—with the portion of power being processed increasing as the voltage gain between the first energy storage device 16 and the DC link 22 increases.

Based on the determination at STEP 86 of the first portion of power received by the bi-directional DC-DC converter assembly 18 to be processed and the second portion of power received by the bi-directional DC-DC converter assembly to remain unprocessed, the technique continues at STEP 88 with the controller 14 causing the bi-directional DC-DC converter assembly 18 to process the first portion of the received power and leave the second portion of the received power unprocessed. In processing the first portion of power, the controller 14 controls operation of switching devices 70 in one or both of the first and second converter sections 38, 40. For example, controller 14 may provide the semiconductor devices that form switching devices 70 with a control/gating signal, wherein the duty cycle of the control signal controls a voltage output of the bi-directional DC-DC converter assembly 18. In leaving the second portion of power unprocessed, the controller 14 causes a certain amount/percentage of power to bypass the first/second converter section 38, 40 that would perform processing thereon.

Subsequent to the causing of the bi-directional DC-DC converter assembly 18 to process the first portion of the received power and leave the second portion of the received power unprocessed, via controller 14, the technique 80 then is completed at STEP 90 by collectively outputting the processed first portion and unprocessed second portion from the bi-directional DC-DC converter assembly 18. The output of the bi-directional DC-DC converter assembly 18 is either provided to the DC bus 22 (when operating in boost mode) or provided to the first energy storage device (when operating in buck mode).

Beneficially, embodiments of the invention thus provide a bi-directional DC-DC power converter processes power received thereby in a variable fashion, in both power flow directions, with a portion of the power received thereby being delivered directly to the other side of the converter without being processed. The bi-directional DC-to-DC partial power converter is provided as a small power rated converter (i.e., less than full power rating), such that the volume and weight thereof is reduced as compared to a full power rating converter—leading to better power density. Additionally, system/converter efficiency is improved by leaving a portion of power provided to the converter unprocessed, as this portion of power that is unprocessed is transferred with almost no loss—i.e., nearly 100% efficiency. Accordingly, the efficiency of the converter is improved without any associated cost increases.

According to one embodiment of the invention, a vehicle system includes a DC link, a load coupled to the DC link and configured to receive energy from the DC link, an energy storage device configured to generate a DC power output, and a bi-directional DC-DC converter assembly coupled to each of the energy storage device and the DC link and positioned therebetween, the bi-directional DC-DC converter comprising a first converter section coupled to the energy storage device and a second converter section coupled to the DC link, wherein the second converter section is also coupled with the energy storage device. The bi-directional DC-DC converter assembly is configured to process a first portion of the DC power output of the energy storage device and provide an unprocessed second portion of the DC power output of the energy storage device to the second converter section, when providing power to the load from the energy storage device and process a first portion of a regenerative power from the load and provide an unprocessed second portion of the regenerative power from the load to the first converter section, when providing regenerative power from the load to the energy storage device.

According to another embodiment of the invention, a vehicle system includes a DC link, a load coupled to the DC link and configured to receive energy from the DC link, an energy storage device configured to generate a DC power output, and a bi-directional DC-to-DC partial power converter configured to selectively operate in a boost mode to boost a voltage of the DC power from the energy storage device to the DC link and a buck mode to buck a voltage of the DC power from the DC link to the energy storage device. In operating the bi-directional DC-to-DC partial power converter in each of the boost mode and the buck mode, a first portion of power received by the bi-directional DC-to-DC partial power converter is processed so as to boost or buck the voltage and a second portion of power received by the bi-directional DC-to-DC partial power converter is unprocessed.

According to yet another embodiment of the invention, a method is provided for transferring power in a vehicle system that includes an energy storage device, a direct current (DC) link, a load, and a bi-directional DC-DC converter assembly. The method includes operating the bi-directional DC-DC converter assembly in a boost mode to boost a DC voltage from an output of the energy storage device to the DC link or in a buck mode to buck voltage from the DC link to the energy storage device. In operating the bi-directional DC-DC converter assembly in the boost mode or the buck mode, the method further includes determining a voltage differential between the energy storage device and the DC link, determining a first portion of power received by the bi-directional DC-DC converter assembly to be processed so as to boost or buck the received power, determining a second portion of power received by the bi-directional DC-DC converter assembly to remain unprocessed, causing the bi-directional DC-DC converter assembly to process the first portion of the received power and leave the second portion of the received power unprocessed, and collectively outputting the processed first portion and unprocessed second portion from the bi-directional DC-DC converter assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle system comprising:
a direct current (DC) link;
an energy storage device; and
a bi-directional DC-DC converter assembly coupled to each of between the energy storage device and the DC link, the bi-directional DC-DC converter assembly comprising:
a first converter section coupled to the energy storage device; and
a second converter section coupled to the DC link and the energy storage device;
wherein the bi-directional DC-DC converter assembly is configured to:
process a first portion of power received from the energy storage device, the processed first portion of power determined by a voltage differential between the energy storage device and the DC link; and
provide the processed first portion of power and an unprocessed second portion of power to the second converter section, the unprocessed second portion of power also determined by the voltage differential.

2. The vehicle system of claim 1 wherein the first converter section and the second converter section each comprise a positive terminal and a negative terminal, the negative terminal of the second converter section being connected in series with the positive terminal of the first converter section.

3. The vehicle system of claim 1 wherein the bi-directional DC-DC converter assembly comprises at least one transformer, with the first converter section comprising a primary winding of the transformer and the second converter section comprising a secondary winding of the transformer.

4. The vehicle system of claim 3 wherein the primary winding receives the first processed portion of power and induces a voltage across the secondary winding that is combined with the second unprocessed portion of power to generate a combined power output from the bi-directional DC-DC converter assembly.

5. The vehicle system of claim 3 wherein the first converter section and the second converter section each comprise a switching network to control current through the primary and secondary windings of the bi-directional DC-DC converter assembly.

6. The vehicle system of claim 5 wherein the switching networks each comprise a half-bridge circuit or a full-bridge circuit.

7. The vehicle system of claim 3 wherein the first converter section and the second converter section each comprise a voltage fed or current fed converter.

8. The vehicle system of claim 1 further comprising a controller configured to control operation of the first converter section and the second converter section based on the voltage differential.

9. The vehicle system of claim 8 wherein the controller is programmed to increase a value of the processed first portion of power and decrease a value of the unprocessed second portion of power as the voltage differential increases.

10. The vehicle system of claim 1 further comprising a second energy storage device coupled between the DC link and the bi-directional DC-DC converter assembly.

11. A vehicle system comprising:
a direct current (DC) link;
an energy storage device;
a bi-directional DC-to-DC partial power converter coupled between the energy storage device and the DC link; and
a controller configured to selectively operate the bi-directional DC-to-DC partial power converter in boost mode to boost a voltage from the energy storage device to the DC link and a buck mode to buck a voltage from the DC link to the energy storage device, the controller programmed to:
determine a value of a processed portion of power received by the bi-directional DC-to-DC partial power converter; and
determine a value of an unprocessed portion of power received by the bi-directional DC-to-DC partial power converter;
wherein the values of the processed and unprocessed portions of power are based on a voltage differential between the energy storage device and the DC link.

12. The vehicle system of claim 11 wherein the bi-directional DC-to-DC partial power converter comprises:
a first converter section coupled to the energy storage device; and
a second converter section coupled to the DC link;
wherein the unprocessed portion of power bypasses one of the first and second converter sections.

13. The vehicle system of claim 12 wherein the bi-directional DC-to-DC partial power converter comprises at least one transformer, with the first converter section comprising a primary winding of the transformer and the second converter section comprising a secondary winding of the transformer.

14. The vehicle system of claim 13 wherein the first converter section and the second converter section each comprise a switching network to control current through the primary and secondary windings.

15. The vehicle system of claim 11 further comprising a load coupled to the DC link.

16. A method of transferring power in a vehicle system that includes an energy storage device, a direct current (DC) link, a load, and a bi-directional DC-DC converter assembly, the method comprising:

operating the bi-directional DC-DC converter assembly in a boost mode to boost a DC voltage from an output of the energy storage device to the DC link or in a buck mode to buck voltage from the DC link to the energy storage device;
wherein operating the bi-directional DC-DC converter assembly in the boost mode or the buck mode comprises:
determining a voltage differential between the energy storage device and the DC link;
determining a first portion of power received by the bi-directional DC-DC converter assembly to be processed, so as to boost or buck the received power;
determining a second portion of power received by the bi-directional DC-DC converter assembly to remain unprocessed;
causing the bi-directional DC-DC converter assembly to process the first portion of the received power and leave the second portion of the received power unprocessed; and
collectively outputting the processed first portion and unprocessed second portion from the bi-directional DC-DC converter assembly.

17. The method of claim 16 wherein causing the bi-directional DC-DC converter assembly to leave the second portion of the received power unprocessed comprises causing the second portion of power received by the bi-directional DC-DC converter assembly to bypass one of a first converter section and a second converter section of the bi-directional DC-DC converter assembly.

18. A vehicle system comprising:
a direct current (DC) link;
an energy storage device; and
a bi-directional DC-DC converter coupled between the energy storage device and the DC link, the bi-directional DC-DC converter comprising:
a first converter section coupled to the energy storage device; and
a second converter section coupled to the DC link and the energy storage device;
wherein the bi-directional DC-DC converter assembly is configured to:
process a first portion of regenerative power received from the DC link, the processed first portion of regenerative power determined by a voltage differential between the energy storage device and the DC link; and
provide the processed first portion of regenerative power and an unprocessed second portion of regenerative power to the first converter section, the unprocessed second portion of regenerative power also determined by the voltage differential.

19. The vehicle system of claim 18 wherein the bi-directional DC-DC converter assembly comprises at least one transformer, with the first converter section comprising a primary winding of the transformer and the second converter section comprising a secondary winding of the transformer.

20. The vehicle system of claim 19 wherein the secondary winding receives the first processed portion of regenerative power and induces a voltage across the primary winding that is combined with the second unprocessed portion of regenerative power to generate a combined power output from the bi-directional DC-DC converter.

21. The vehicle system of claim 18 further comprising a controller configured to control operation of the first converter section and the second converter section based on the voltage differential.

22. The vehicle system of claim 21 wherein the controller is programmed to increase a value of the first processed portion of regenerative power and decrease a value of the second unprocessed portion of regenerative power as the voltage differential increases.

* * * * *